(12) United States Patent
Mueck

(10) Patent No.: US 8,406,780 B2
(45) Date of Patent: Mar. 26, 2013

(54) LTE OPERATION IN WHITE SPACES

(75) Inventor: Markus Mueck, Unterhaching (DE)

(73) Assignee: Intel Mobile Communications GmbH, Neubiberg (DE)

(*) Notice: Subject to any disclaimer, the term of this patent is extended or adjusted under 35 U.S.C. 154(b) by 100 days.

(21) Appl. No.: 13/006,740

(22) Filed: Jan. 14, 2011

(65) Prior Publication Data
US 2012/0184283 A1  Jul. 19, 2012

(51) Int. Cl.
*H04W 72/00* (2009.01)
(52) U.S. Cl. ............... 455/452.1; 455/450; 455/451; 455/454; 370/328; 370/338; 370/341
(58) Field of Classification Search .............. 455/450, 455/451, 452.1, 452.2, 453, 454; 370/328, 370/338, 341
See application file for complete search history.

(56) References Cited

U.S. PATENT DOCUMENTS

| | | |
|---|---|---|
| 2001/0036810 A1 | 11/2001 | Larsen |
| 2002/0104011 A1 | 8/2002 | Svoboda et al. |
| 2005/0128995 A1 | 6/2005 | Ott et al. |
| 2008/0192820 A1 | 8/2008 | Brooks et al. |
| 2009/0196180 A1 | 8/2009 | Bahl et al. |
| 2010/0124254 A1 | 5/2010 | Wu et al. |
| 2010/0142454 A1 | 6/2010 | Chang |
| 2010/0195580 A1 | 8/2010 | Samarassoriya et al. |
| 2010/0216478 A1 | 8/2010 | Buddhikot et al. |
| 2010/0216480 A1 | 8/2010 | Park et al. |
| 2010/0248631 A1 | 9/2010 | Chaudhri et al. |
| 2010/0296404 A1 | 11/2010 | Quadri et al. |
| 2011/0053539 A1* | 3/2011 | Sundstrom et al. ........ 455/226.1 |
| 2012/0122448 A1* | 5/2012 | Mueck et al. ................ 455/424 |

FOREIGN PATENT DOCUMENTS

| | | |
|---|---|---|
| EP | 1722512 A1 | 11/2006 |
| GB | 2461724 A | 1/2010 |
| GB | 2465756 A | 6/2010 |
| WO | 2004095167 A2 | 11/2004 |
| WO | 2005062504 A1 | 7/2005 |
| WO | 2006113872 A1 | 10/2006 |
| WO | 2006138581 A2 | 12/2006 |

(Continued)

OTHER PUBLICATIONS

Jeong, et al., "An Efficient UE Modem Platform Architecture for 3GPP LTE", Proceeding of the SDR 06 Technical Conference and Product Exposition, 2006 SDR Forum, p. 1-4.

(Continued)

*Primary Examiner* — Wayne Cai
(74) *Attorney, Agent, or Firm* — Eschweiler & Associates, LLC

(57) ABSTRACT

One embodiment of the present invention relates to a method for efficient reassignment of a secondary communication channel (having a first priority) within a white space, upon arrival of a conflicting primary user signal (having a second priority higher than the first priority). In particular, the method comprises reassigning a secondary communication channel to unused portions of one or more white spaces remaining after the arrival of one or more primary users. For example, in one embodiment wherein one or more secondary communication channels are operated at contiguous secondary frequency ranges within a white space, a primary/incumbent user may arrive at a frequency range that conflicts with the secondary frequency range and that generates unused frequency portions of the white space(s). The secondary communication channel may be reassigned to the unused frequency portions of the white space (e.g., forming a non-contiguous secondary communication channel, forming a secondary communication channel having a reduced bandwidth).

20 Claims, 10 Drawing Sheets

FOREIGN PATENT DOCUMENTS

| | | |
|---|---|---|
| WO | 2007045779 A1 | 4/2007 |
| WO | 2008119948 A1 | 10/2008 |
| WO | 2009005971 A1 | 1/2009 |
| WO | 2009085266 A2 | 7/2009 |

OTHER PUBLICATIONS

"Cognitive Radio Technologies Proceeding (CRTP) ET Docket No. 03-108", http://www.fcc.gov/oet/cognitiveradio/, Preprinted from Internet on Jan. 14, 2011, p. 1-3.

FCC White Spaces Access Rules: "Unlicensed Operation in the TV Broadcast Bands", Final Rules, http://edocket.access.gpo.gov/2009/pdf/E9-3279.pdf, Reprinted from Internet on Jan. 14, 2011, p. 1-19.

Fanny Mlinarsky, "Presentation: White Spaces Regulations and Standards", octoScope, Jan. 27, 2010, p. 1-60.

Myung, "Presentation: Technical Overview on 3GPP LTE", http://hgmyung.googlepages.com/3gppLTE.pdf., May 18, 2008, p. 1-53.

"LTE-Advanced and the Evolution to 4G Cellular System"; http://www.ece.gatech.edu/research/labs/bwn/Itea/fig/cc1_multiple_spectrum.jpg&imgrefurl=http://www.ece.gatech.edu/research /labs/bwn/Itea/projectdescription. html&usg=_3jFyXaHTcurZgqXq4jUtBYkbag8=&h=262&w=557&sz=24&hl=de&start=1&um=1&itbs=1&tbnid=9h418RecjvNbgM:&tbnh=63&tbnw=133&prev=/images%3Fq%3Dnon-contiguous%2Blte%26um%3D1%26hl%3Dde%26sa%3DN%26-tbs%3Disch:1, Reprinted from Internet on Jan. 14, 2011, p. 1-12.

\* cited by examiner

LTE OPERATION IN WHITE SPACES

BACKGROUND OF THE INVENTION

Many modern day communication devices (e.g., radios, televisions, cellular telephones, etc.) transfer information wirelessly using electromagnetic waves. Information can be broadcast wirelessly over a broad range of frequencies. In general, electromagnetic radiation having a frequency of 9 kHz to about 300 GHz (e.g., radio waves and microwaves) comprises a broadcast spectrum that may be used to transmit information.

The use of electromagnetic radiation within the broadcast spectrum is often regulated in different geographical regions by governments or international bodies. Such regulation typically allocates frequencies within the broadcast spectrum to different purposes. For example, in the United States, the Federal communications commission (FCC) assigns frequency allocations to various purposes (e.g., frequencies allocated to TV broadcasting in the United States comprise 54 MHz-72 MHz, 512 MHz-608 MHz, etc. and frequencies allocated to TV broadcasting in Europe comprise bands 470 MHz-490 MHz, etc.).

DETAILED DESCRIPTION OF THE INVENTION

Figure 1A:
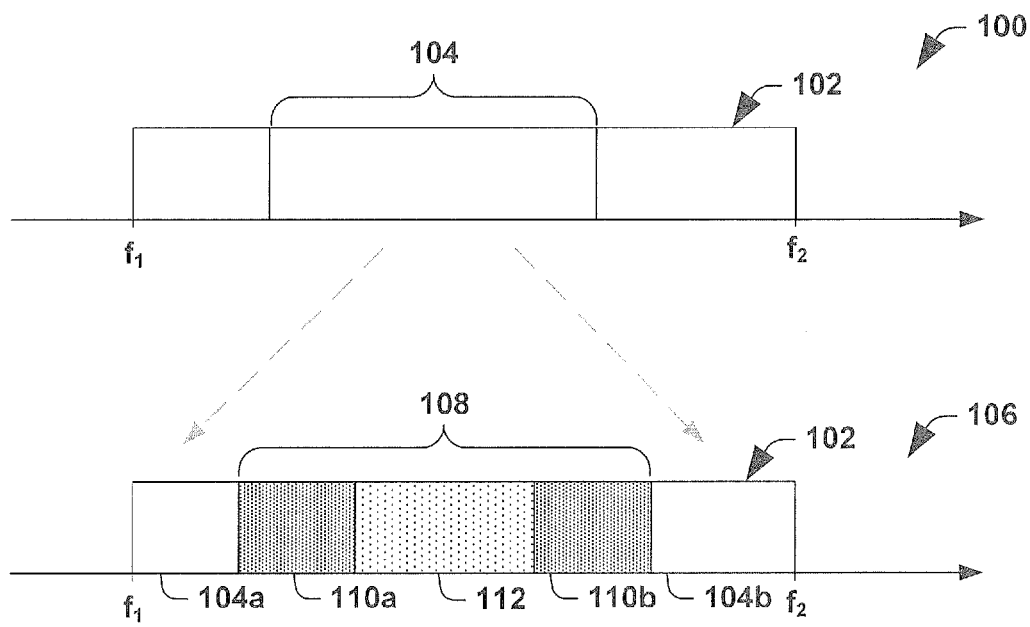
FIG. 1a illustrates frequency spectrum diagrams showing a first embodiment of an efficient frequency reassignment of a secondary communication channel within a white space.

The present invention will now be described with reference to the attached drawing figures, wherein like reference numerals are used to refer to like elements throughout, and wherein the illustrated structures and devices are not necessarily drawn to scale.

Within the broadcast spectrum (e.g., electromagnetic radiation having a frequency between 9 MHz and 3 GHz) there is a large amount of unused frequency spectrum. White spaces are unused spectrum that sit between frequency spectrum currently used to transmit data. White spaces may exist throughout the frequency spectrum. For example, in recent years the prevalence of white spaces within frequencies allocated for TV broadcasters has increased as many of the TV frequency bands have been vacated by TV's move to digital. Furthermore, whether a given region of the spectrum is occupied may depend on the size and demand of the local population. For example, an urban area with a lot of broadcast stations may have few white spaces since it would fill up most of the spectrum allocated for radio and television, while a rural area may have many white spaces since it would leave much of the spectrum allocated for radio and television unused.

In appreciation of the large amount of unused spectrum and to efficiently make use of unused frequency spectrum, white spaces may be used to supplement traditionally allocated frequency spectrums (e.g., cell phone communication spectrum), thereby increasing the available frequency spectrum for communication areas that experience heavy usage. In particular, white spaces within TV frequency ranges are considered prime spectrum for offering wireless broadband services because such frequency ranges allow wireless signals to travel long distances and penetrate through walls.

As described herein, in such frequency sharing schemes, there are primary/incumbent users and secondary users. The primary/incumbent users are the originally allocated users (e.g., in the United States the primary users in the 512-608 MHz frequency range are TV broadcast systems). The secondary users are users who may utilize the white spaces within a frequency spectrum (e.g., in the United States a wireless communication device may be a primary/incumbent user in the 512-608 MHz frequency range).

Typically, the arrival of a primary/incumbent user (e.g., a TV broadcast system) within a white space will cause a secondary user to switch to an empty frequency spectrum within a different frequency allocation, thereby not efficiently using existing spectrum resources of the white space (e.g., after the arrival of a primary/incumbent user, parts of the spectrum may still be available for secondary users and a complete switch to another band leaves those resources unused). For example, a cellular telephone may use white space frequencies within a TV frequency allocation band as a secondary user. The primary/incumbent user (i.e. a TV broadcaster) may arrive rendering parts of the white space unusable for cellular applications. The cellular system may search for a new frequency band in the TV White space bands that is currently unused by the primary/incumbent users. If a new band is available, the communication is switched to this new band. However, if a new frequency channel within the TV white space band cannot be found, the cellular system uses an available frequency band in the licensed spectrum bands that are allocated to the corresponding operator thereby not efficiently using existing spectrum resources of the white space.

Accordingly, a method and apparatus for efficient reassignment of a frequency spectrum of a secondary communication channel within a white space, upon arrival of a conflicting primary/incumbent user signal (having a priority higher than that of the secondary communication channel), is provided herein. In one embodiment, the method comprises reassigning one or more secondary communication channels to unused portions of a white space remaining after the arrival of a primary/incumbent user. For example, in one embodiment wherein one or more secondary communication channels are operated at contiguous secondary frequency ranges within a white space, the arrival of a primary/incumbent user at a frequency range that conflicts with the secondary frequency ranges may generate unused frequency portions of the white space. A secondary communication channel may be reassigned to one or more of the unused frequency portions of the white space, thereby allowing communication of the secondary communication channel to continue within the white space.

In one embodiment, the method and apparatus may comprise generating one or more secondary communication channels from unused portions of a white space, wherein the one or more secondary communication channels have a non-contiguous frequency spectrum. In an alternative embodiment, the method and apparatus may comprise generating one or more secondary communication channels from unused portions of a white space, wherein the one or more secondary communication channels have a contiguous frequency spectrum having a reduced contiguous bandwidth (e.g., having a contiguous bandwidth smaller than the original secondary communication channel) remaining unused after the arrival of the primary/incumbent user.

In one particular embodiment, a routing logic circuit is configured, upon arrival of a primary/incumbent user signal having a frequency spectrum that conflicts with the frequency spectrum of the secondary communication channels, to re-assign a contiguous secondary communication channel to one or the one or more non-contiguous frequency channels by selectively re-route secondary signal data to selected filters within a filter array, wherein the non-contiguous frequency channel is chosen to have frequencies that are different than the frequency spectrum of the primary user signal.

It will be appreciated that the methods and apparatus, provided herein, may be applied to a broad range of applications and that therefore the use of the term "primary user" is not intended to limit the application of aspects of the disclosed invention. Instead the terms "primary user" and "secondary user", as used herein, refer to a priority of assignment to a frequency spectrum (e.g., a primary user may have a first priority and a secondary user may have a second priority, wherein the first priority is greater than the second priority). In other words, the primary user may have a higher priority to use a given frequency spectrum than a secondary user, such that competing interests for a frequency space, between a primary user and secondary user, will be resolved by assigning the frequency space to the primary user.

For example, in one embodiment a primary user may comprise a spectrum owners (e.g., TV broadcaster), while in another embodiment, a primary user may comprise and spectrum owners as well as users of slightly lower priority (e.g., in one embodiment the methods and apparatus provided herein may be applied to secondary users comprising PSME applications such as wireless microphones and "primary users" comprising incumbent radio services/systems). In alternative embodiments, the method may also be applied to Long Term Evolution (LTE), LTE-Advanced, Worldwide Interoperability for Microwave Access (WiMAX), IMT advanced, etc. communication channels.

FIG. 1a illustrates frequency spectrum diagrams showing a first embodiment of an efficient frequency reassignment of a secondary communication channel within a white space. In particular, frequency diagram 100 illustrates a white space 102 extending from frequency $f_1$ to $f_2$. In frequency diagram 100, since a primary user (having a first priority) is not utilizing the frequency spectrum to transmit data, a secondary communication channel 104 (having a second priority, lower than the first priority) may comprise a contiguous frequency band within any part of the white space 102.

Frequency diagram 106 illustrates the arrival of a primary user signal 108 within the white space 102. The primary user signal 108 may occupy a frequency spectrum that utilizes a portion of the secondary communication channel 104 and which leaves no remaining contiguous portion of the white space 102 with sufficient bandwidth to be used for the secondary communication channel. For example, as shown in frequency diagram 106, the primary user signal 108 is located in a frequency spectrum that occupies a portion of the contiguous secondary communication channel 104 and that splits the white space 102 into two remaining sections, 104a and 104b, each of which is smaller than the secondary communication channel 104.

However, even after the arrival of the primary user signal 108, sufficient frequency resources remain within the white space 102 to efficiently transmit data over the secondary communication channel. Therefore, as provided herein a new secondary communication channel may be formed within the white space 102 based on a non-contiguous allocation of the remaining unused spectrum of the white space. For example, as shown in FIG. 1, the contiguous secondary communication channel (frequency diagram 100) may be reassigned to a non-contiguous channel (frequency diagram 106) comprising a first portion 104a and a second portion 104b, which cumulatively comprise a bandwidth sufficient to act as the secondary communication channel (i.e., which cumulatively comprise a bandwidth equal to that of secondary communication channel 104). Therefore, reassignment of bifurcated secondary communication channel data to a non-contiguous frequency spectrum allows for continued data transmission of the secondary communication channel within a white space 102 having a primary user signal 108.

For example, in one particular embodiment, a white space 102 extending from 512 MHz to 562 MHz may comprise a secondary communication channel 104 having a contiguous frequency spectrum extending from 520 MHz to 540 MHz. The arrival of a primary user signal 108 having a frequency of 530 MHz to 550 MHz occupies a portion of the contiguous secondary communication channel 104 and splits the white space 102 into two remaining portions, 104a and 104b, respectively extending from 512 MHz to 530 MHz and from 550 MHz to 562 MHz. The secondary communication channel may be divided and reassigned to portions 104a and 104b to form a non-contiguous secondary communication channel comprising frequencies 520 MHz to 530 MHz and 550 MHz to 560 MHz.

Figure 1B:
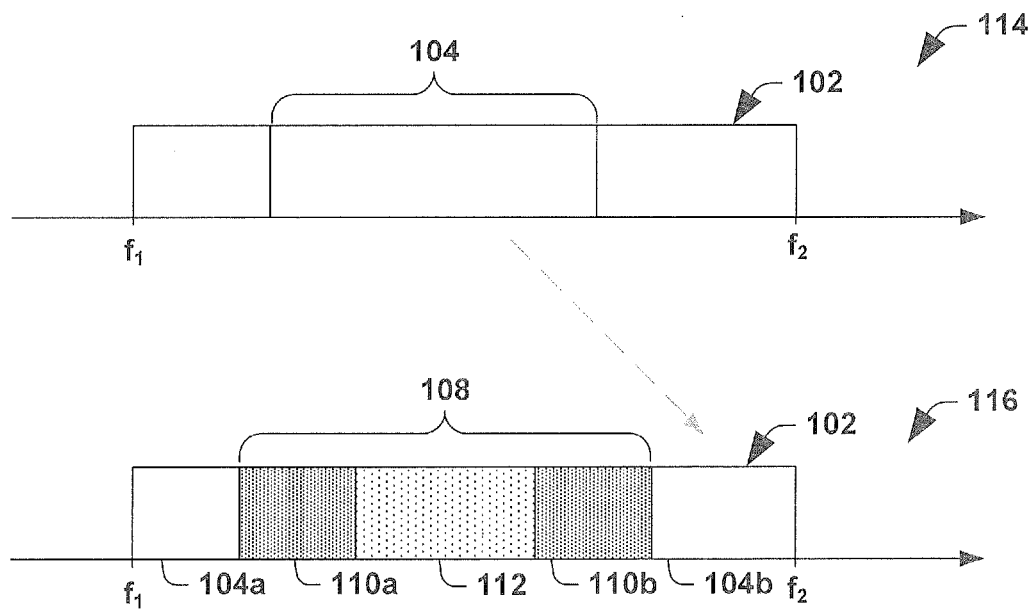
FIG. 1b illustrates frequency spectrum diagrams showing an alternative embodiment of an efficient frequency reassignment of a secondary communication channel within a white space.

FIG. 1b illustrates frequency spectrum diagrams 114 and 116 showing an alternative embodiment of an efficient frequency reassignment of a secondary communication channel within a white space. As shown in FIG. 1b a secondary communication channel 104 is reassigned to an unused portion of a white space 104a or 104b upon the arrival of a primary user 108 within the white space 102. The one or more reassigned secondary communication channels have a contiguous frequency spectrum that may have a reduced bandwidth (e.g., having a bandwidth smaller than the original secondary communication channel) in comparison to the secondary communication channel 104 shown in diagram 114.

Although the method of reassignment is illustrated herein (e.g., in FIG. 1, 4, 11, etc.) as having a single primary user entering a white space to generate two unused/remaining portions, one of ordinary skill in the art will appreciate that the reassignment provided herein may be applied to a plurality of primary users and white spaces. For example, in one embodiment, a plurality of primary users may enter one or more white spaces, thereby resulting in a plurality of unused/remaining portions within the one or more white spaces that may be used to transmit secondary user data (e.g., secondary data may be transmitted in a non-contiguous manner using unused remaining frequency spectrum in a plurality of white spaces). In another embodiment, the secondary communication channels may operate within a single white space or within multiple white spaces (e.g., a first secondary communication channel may operate within a first white space and a second secondary communication channel may operate within a second white space).

Furthermore, it will be appreciated that the method of reassignment (e.g., generating a non-contiguous secondary communication channel within a white space) may be applied to white spaces located anywhere within the broadcast spectrum (e.g., at frequencies between 9 MHz and 300 GHz). For example, a non-contiguous secondary communication channel may be formed in white spaces in TV bands, International Mobile Telecommunications (IMT)-Advanced bands, military bands, public safety bands, and wireless medical telemetry bands, subject to compliance to national and international radio regulations in these frequency bands.

Furthermore, it will be appreciated that the term primary user may comprise a variety of communication signals. For example, as shown in frequency diagram 106, the primary user signal 108 may comprise a primary user band 112 and guardbands 110a and 110b flanking the primary user band. In alternative embodiments, the primary user band 112 may comprise a signal guardband 110a or 110b, or may comprise no guardbands.

Reassignment of a contiguous secondary communication channel to a non-contiguous secondary communication channel may be accomplished with a frequency reassignment circuit configured to detect the presence of a primary user within a white space and to reassign the secondary communication channel frequency in response. The reassignment circuit may be comprised within a wireless transceiver device (e.g., a cell phone) and selectively activated when a primary user signal is detected within a white space being used by the secondary communication channel.

Figure 2:
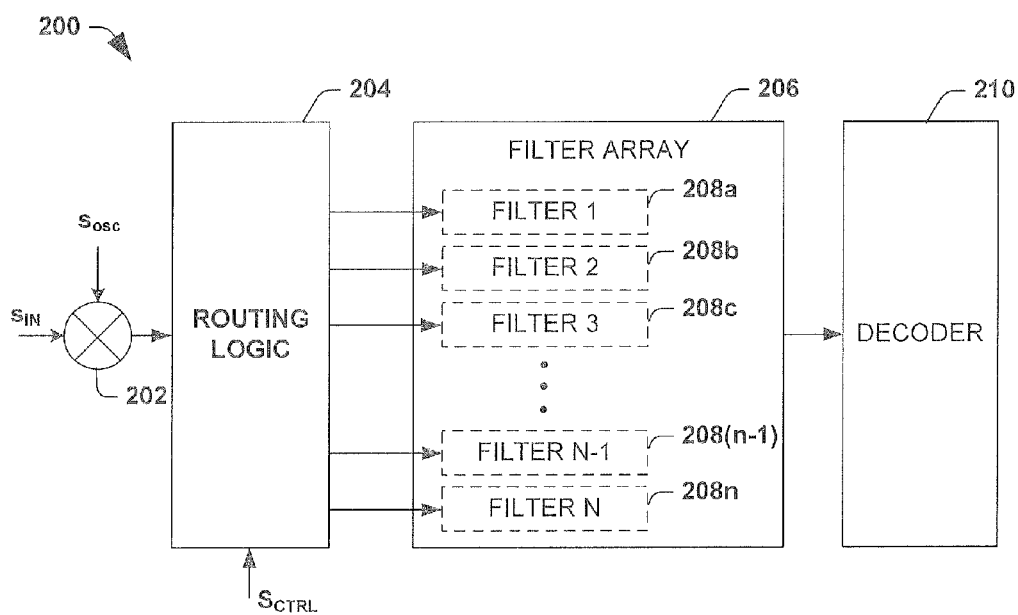
FIG. 2 illustrates a frequency reassignment circuit configured to divide and reassign portions of a contiguous secondary communication channel to a non-contiguous communication channel.

FIG. 2 illustrates an exemplary embodiment of a frequency reassignment circuit 200 configured to divide and reassign portions of a contiguous secondary communication channel to a non-contiguous secondary communication channel. As shown in FIG. 2, the frequency reassignment circuit 200 accomplishes reassignment of a secondary communication channel may through the selective use of a filter array 206 comprising a plurality of filters 208a-208n (e.g., digital filters, analog filters).

In particular, the secondary communication channel data may be provided as an input signal $S_{IN}$ to a mixer 202 configured to down-convert the input signal for filtering. The down-converted secondary communication signal is provide to a routing logic circuit 204 configured to selectively provide the down-converted secondary communication signal to one or more specific filters (e.g., 208a-208n) within a filter array 206, based upon a control signal $S_{CRTL}$. In one embodiment, filters may comprise digital filters, configured to operate an algorithm that digitally filters the routed signal. In an alternative embodiment, the filters may comprise analog filters configured to filter the routed signal.

Figure 3:
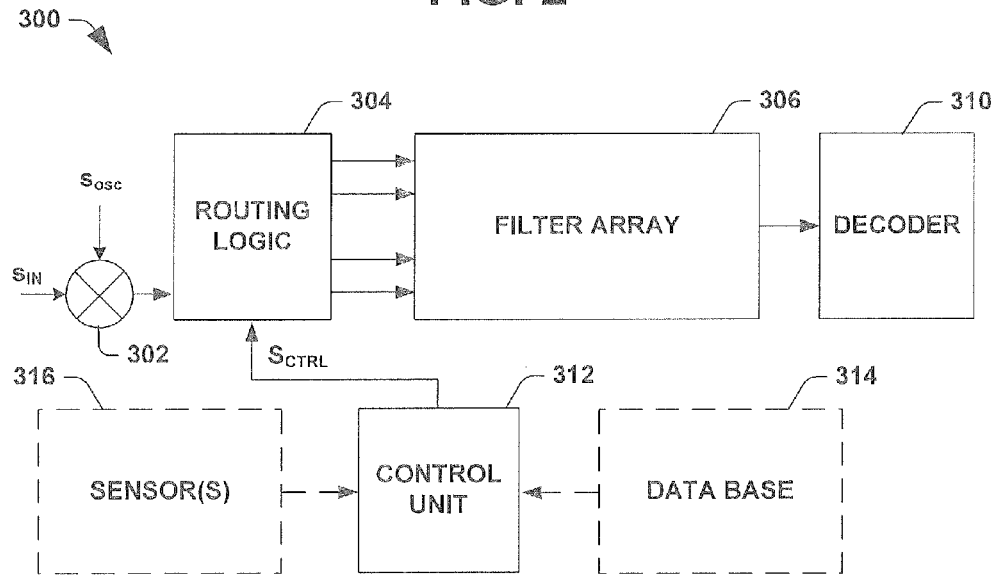
FIG. 3 illustrates an alternative embodiment of a frequency reassignment circuit having a control unit configured to provide a control signal.

In one embodiment shown in FIG. 3, the reassignment circuit 300 may comprise a control unit 312 configured to generate the control signal $S_{CTRL}$ that operates the routing logic block 304. In one embodiment, the control unit 312 may be configured to detect the arrival of a primary user signal, within a white space being used by a the secondary communication channel, by communicating with a data base 314 comprising predefined usage of the white space frequency. The data base 314 may track frequency spectrum usage (e.g., and therefore white spaces) by storing information concerning temporal and geographic frequency use. In an alternative embodiment, the control unit 312 may be coupled to one or more sensors 316 configured to sense the arrival of a primary user signal within the white space.

The filter array 206 may comprise a plurality of filters 208a-208n configured to generate one or more secondary communication channels having a non-contiguous frequency spectrum. The routing logic circuit 204 is configured, upon arrival of a primary user signal having a frequency spectrum that conflicts with the frequency spectrum of the secondary communication channel, to re-assign a contiguous secondary communication channel to one or the one or more non-contiguous frequency channels by selectively re-routing secondary signal data to selected filter combinations within the filter array, wherein the non-contiguous frequency channel is chosen to have frequencies that are different than the frequency spectrum of the primary user signal.

The output of the filter array may be provided to a decoder 208. If the filter array 206 comprises digital filters the decoder 208 may comprise a DAC to convert the output signal from the filter array to an analog signal. If the filter array comprises analog filters the decoder 208 may comprise an upconverter configured to upconvert the output signal from the filter array.

Figure 4:
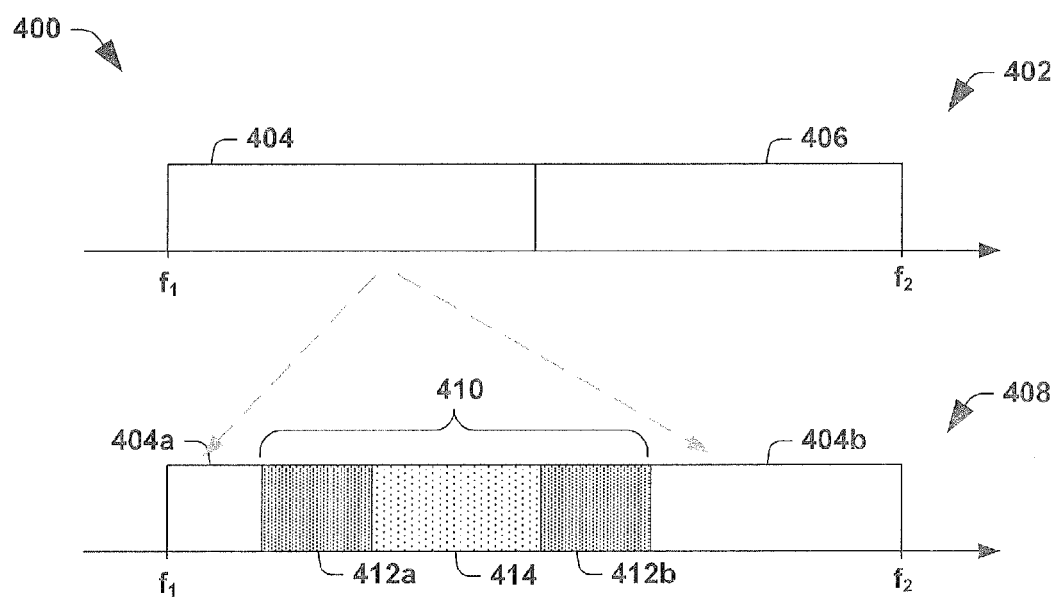
FIG. 4 is a frequency spectrum diagram showing two neighboring 20 MHz LTE channels within a TV white space.

It will be appreciated that the method and apparatus for reassignment, as provided herein, may be applied to more than one secondary communication channel (e.g., two, three, etc.) within a white space. For example, FIG. 4 illustrates the reassignment of two adjacent contiguous secondary communication channels spanning a white space. In particular, two neighboring secondary communication channels 404 and 406 are comprised within a white space 402 extending from frequency $f_1$ to frequency $f_2$. In one embodiment, wherein the secondary communication channels comprise LTE channels within a TV white space, each of a lower LTE channel 404 and a higher LTE channel 406 comprise a contiguous 20 MHz bandwidth, resulting in the higher and lower LTE channels cumulatively spanning a 40 MHz frequency spectrum of the TV white space (i.e., $f_2-f_1=40$ MHz).

The arrival of a primary user signal 410 (e.g., a TV broadcast signal) may occur at a frequency band that utilizes a portion of each secondary communication channels, thereby rendering each secondary user communication channel 404 and 406 unable to form a contiguous frequency spectrum sufficient to transmit a secondary communication channel. For example, in one embodiment the arrival of a primary user signal 410 comprising a TV channel broadcast having a bandwidth of 18 MHz (e.g., a 6 MHz frequency band 414 and two 6 MHz guard bands 412a and 412b, for a total primary user bandwidth of 18 MHz) utilizes a portion of each of the contiguous LTE 20 MHz channels 404 and 406.

However, since the arrival of the primary user signal 410 forms two non-contiguous portions 404a and 404b that comprise sufficient resources (e.g., out of the total 40 MHz bandwidth) to efficiently transmit secondary communication channel data, use of the white space resources by a communication device may be continued for transmission of a secondary user communication channel (e.g., 404 or 406). For example, the arrival of a primary user signal 410 having a bandwidth of 530-550 MHz within a TV white space extending from frequency 520-560 MHz will result in unused spectrum, 404a and 404b, from 520-530 MHz and from 550-560 MHz.

A new channel (e.g., 20 MHz LTE channel) may be formed from these unused spectrum based on a non-contiguous assignment of the secondary communication channel to the unused spectrum. For example, the new assignment may form a non-contiguous channel comprising a first portion extending from 520-530 MHz and a second portion extending from 550-560 MHz, which cumulatively comprise a 20 MHz bandwidth.

FIGS. 5-10 illustrate a more detailed embodiment of an application of the method and apparatus provided herein to a 3GPP long term evolution (LTE) communication system configured to transmit data over TV white spaces. It will be appreciated that aspects of the invention described in respect to FIGS. 5-10 are not limited to application for LTE communication systems but may be applied to any communication system.

Furthermore, it will be appreciated that the 6 MHz channel size described in relation to FIGS. 5-10 is an exemplary channel size included herein to aid in explanation of the invention. The 6 MHz channel size corresponds to a TV broadcast channel size utilized in an ATCS (advanced television systems committee) system (e.g., a TV channel size used in the United States, to provide a channel bandwidth of 18 MHz: a 6 MHz ATCS channel size surrounded by 6 MHz guard bands/channel isolation). However, the method and apparatus provided herein may be applied to other channel sizes. For example, one of ordinary skill in the art will readily appreciate that alternative channel sizes may be used, such as a 7 MHz or 8 MHz DVB-T channel size and spacings (i.e., a 21 MHz or 24 MHz channel bandwidth), for example.

Figure 5:
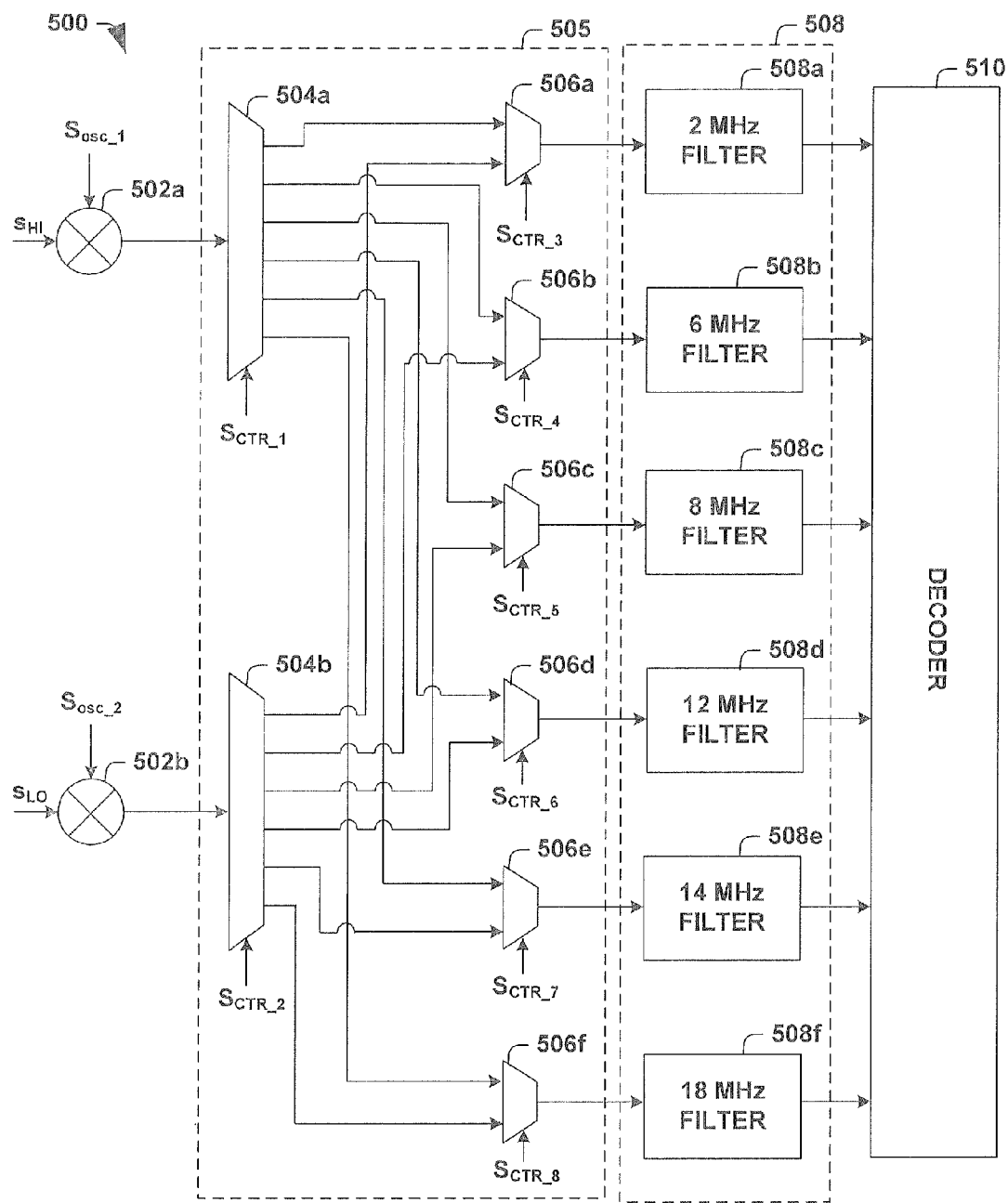
FIG. 5 illustrates a frequency reassignment circuit that is configured to account for the ten possible frequency reassignment combinations for 20 MHz LTE channels within a TV white space.
Figure 6:
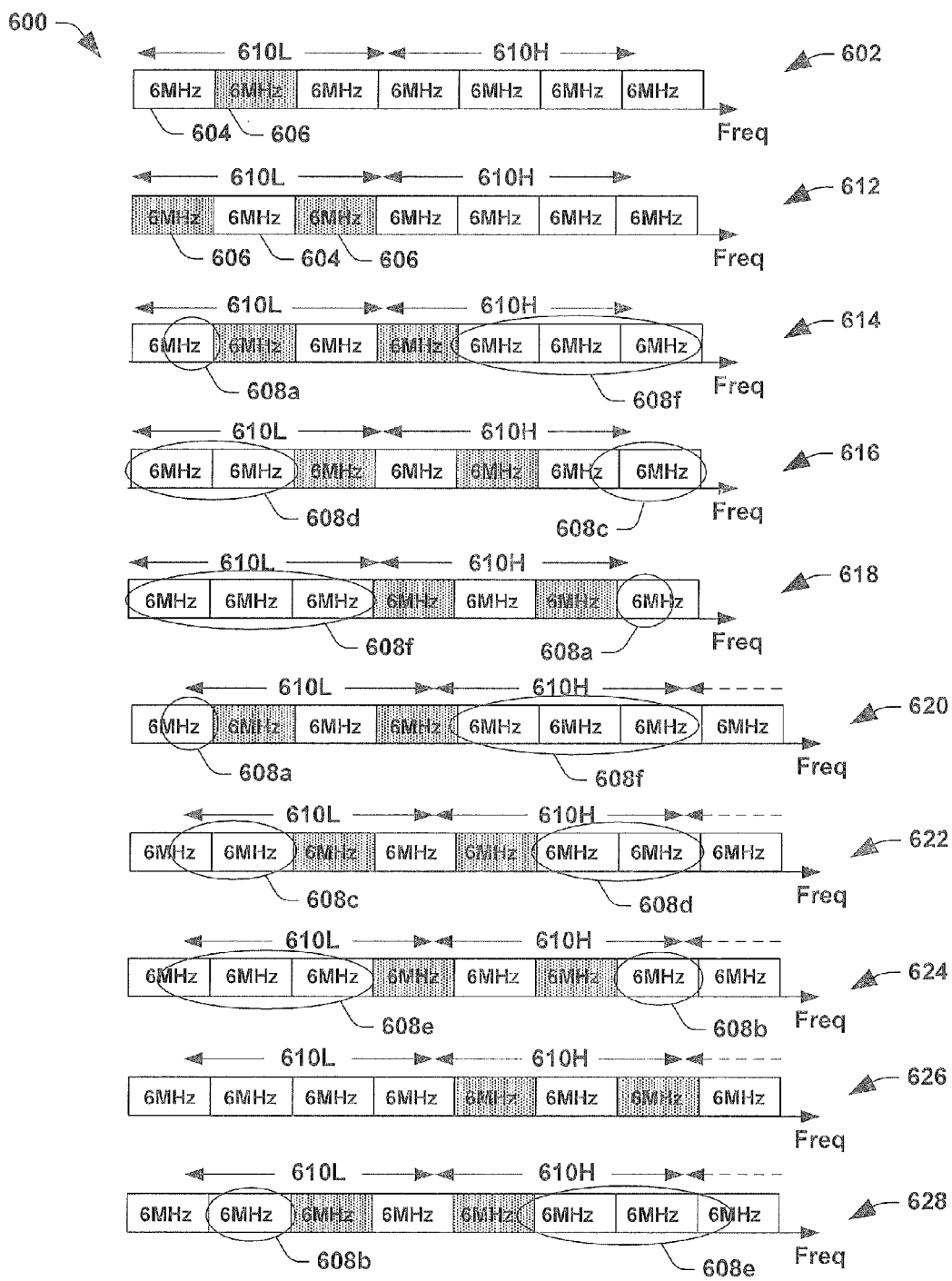
FIG. 6 illustrates frequency diagrams corresponding to the possible non-contiguous frequency assignments enabled by the frequency reassignment circuit of FIG. 5.

The inventors have appreciated that in an embodiment wherein the method and apparatus are utilized to generate a non-contiguous 20 MHz LTE channels within a TV white space, there are ten spectrum combinations for non-contiguous assignments that are possible. Accordingly, a reassignment apparatus may be configured to comprise a filter bank that may account for the ten spectrum combinations of reassignment. FIG. 5 illustrates a frequency reassignment circuit that is configured to account for the ten possible combinations of reassignment. FIG. 6 illustrates frequency diagrams corresponding to each of the ten non-contiguous frequency reassignments.

Referring to FIG. 5, the reassignment circuit 500 is configured to receive a lower channel LTE signal $S_{LOW}$ and higher channel LTE signal $S_{HIGH}$. In one embodiment, the lower LTE frequency channel is provided to a first mixer 502a configured to down-convert the input signal for filtering (e.g., based upon oscillator signal $S_{OSC\_1}$) and the higher LTE frequency channel is provided to a second mixer 502b configured to down-convert the input signal for filtering (e.g., based upon oscillator signal $S_{OSC\_2}$). In one embodiment, the down-converters 502a and 502b are configured to down-convert the input signals to frequencies specifically chosen to enable proper operation of the filtering functions described below (e.g., that allow the filters 508a-508n to properly filter out portions of the down-converted input signals that conflict with the primary user signal, as described below in FIGS. 7a and 7b).

The down-converted input signals may be provided to a routing logic circuit 505 configured to selectively re-routing the down-converted input signals to selected combinations of filters 508a-508n within a filter array 508. In operation, the routing circuit comprises one or more multiplexers configured to selectively provide a down-converted LTE frequency channel to one or more selected filter(s), within the filter array, that are chosen based upon control signals $S_{CRTL\_X}$ to generate an output frequency spectrum that avoids the frequency of the primary user's TV signal. In one embodiment, shown in FIG. 5, the routing circuit 505 may comprise a first set of multiplexers, 504a and 504b, and a second set of multiplexers 506a-506n which together are configured to provide a down-converted signal to selected filters within a filter array 508.

The filter array 508 comprises a plurality of filters 508a-508n specifically chosen to accommodate the combinations of non-contiguous channel reassignment (e.g., shown in FIG. 6). In one embodiment, the filters 508a-508n may comprise analog band-pass or low-pass filters, depending on RF-front-end architecture. In particular, to accommodate a 20 MHz LTE signal within a TV white space, the filter array comprises six different filters: a 2 MHz filter 508a, a 6 MHz filter 508b, an 8 MHz filter 508c, a 12 MHz filter 508d, a 14 MHz filter 508e, and an 18 MHz filter 508f. Each of the filters is configured to filter a down-converted input signal to generate an output signal having a limited bandwidth. For example, the 2 MHz filter is configured to receive a down-converted LTE signal and to filter the LTE signal to generate an output signal having a 2 MHz bandwidth.

Referring to FIG. 6, frequency diagrams illustrate ten possible non-contiguous channel reassignment for an 18 MHz primary user within a white space having a 6 MHz channel size. In frequency diagrams 602, 612, 614, 616, and 618 the secondary communication channels are configured to occupy a channel bandwidth that has a minimum frequency value that is concurrent with an edge of a 6 MHz frequency band. In frequency diagrams 620, 622, 624, 626, and 628, the secondary communication channels are configured to occupy a channel bandwidth having a minimum frequency value that is not concurrent with an edge of a 6 MHz frequency band.

It will be appreciated that the re-assignment circuit shown in FIG. 5, may selectively reassign LTE data as the need arises. Therefore, as shown in frequency diagrams 602 and 612, wherein the primary user (e.g., comprising a primary user TV band 604 and guard bands 606) arrives at a frequency that utilizes part of a single LTE channel, the reassignment circuit will take no action. For example, in frequency diagram 602, since the primary user signal interferes with the lower LTE channel 610L but not the higher LTE channel 610H, the lower LTE channel 610L is moved to another carrier frequency while the higher LTE channel 610H is kept as is. Similarly, in frequency diagram 610, the lower LTE channel 610L is moved to another carrier frequency while the higher LTE channel 610H is kept as is.

In frequency diagram 614 the primary user signal arrives at an 18 MHz band which utilizes a part of the lower and higher LTE channel. In such a case, the high/low LTE communication channel is moved to another carrier frequency while the lower/high LTE communication channel is broken into a non-contiguous secondary communication channel comprising the remaining parts of the white space using a 2 MHz filter 608a and an 18 MHz filter 608f. For example, the lower LTE channel is down-converted and provided to the 2 MHz filter and the LTE channel is down-converted provided to the 18 MHz filter. The filters respectively cut off part of the lower and upper channels to build a non-contiguous spectrum that is used as a secondary communication channel.

Referring to FIG. 5, the reassignment circuit 500 may generate the non-contiguous secondary communication channel of frequency diagram 614 using a first control signal $S_{CTR\_1}$ that causes MUX 504a to send the down-converted high LTE communication channel signal to MUX 506e. The output of MUX 506e is provided to an 18 MHz digital filter configured to pass the highest 18 MHZ of the high LTE channel signal through the filter to generate an 18 MHZ higher channel signal. A second control signal $S_{CTR\_2}$ causes MUX 504b to send the down-converted low LTE communication channel signal to MUX 506a. The output of MUX 506a is provided to a 2 MHz filter configured to pass the lowest 2 MHz of the low LTE communication channel signal through the filter to generate a 2 MHZ lower channel signal at a translated frequency. Cumulatively the lower 2 MHz lower channel signal and the higher 18 MHz higher channel signal comprise the low channel LTE communication channel.

Figure 7A:
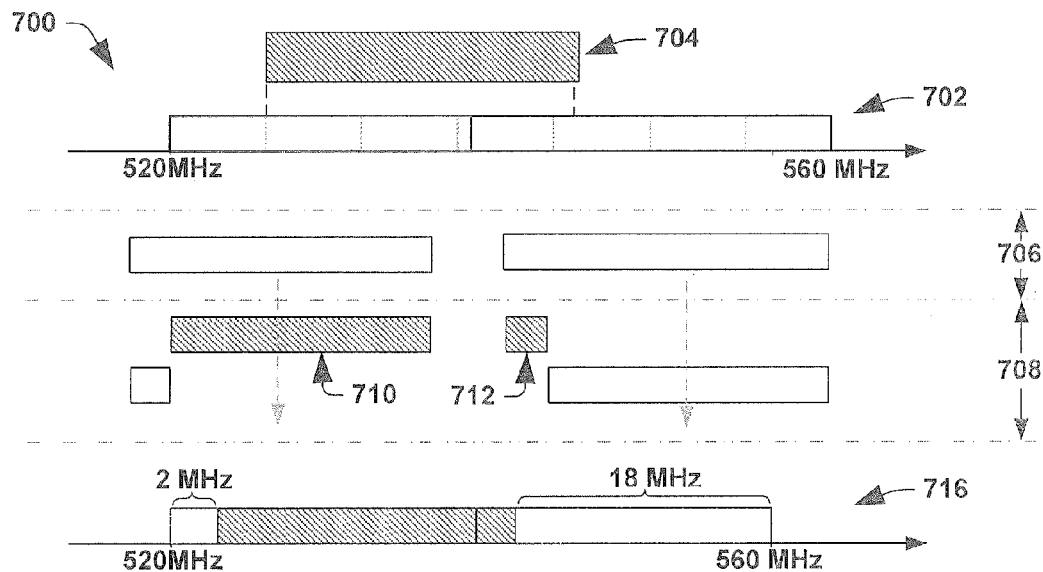
FIGS. 7a-7b illustrate frequency diagrams showing filtering of contiguous LTE channels to generate a non-contiguous LTE channel.

FIG. 7a shows a particular example of the application of the 2 MHz filter and the 18 MHz as shown in signal diagram 612. As shown in FIG. 7a, the primary user signal 704 may arrive at a frequency of 530-550 MHz within a white space 702 extending from frequency 526-546 MHz, thereby resulting in an unused spectrum from 520-526 MHz and from 546-560 MHz. The low LTE communication channel may down-converted (at 706) to a frequency that may be provided to a 2 MHz filter 710 so that the lowest 2 MHz of the channel is passed (filtering is shown at 708). The high LTE communication channel may down-converted (at 706) and provided to an 18 MHz filter 712 so that the highest 18 MHz of the channel is passed. The data originally transmitted by the lower/higher LTE channel may then be transmitted using the non-contiguous 20 MHz of a secondary communication frequency that avoids the frequency spectrum of the primary user.

In frequency diagram 616 the low LTE channel may be down-converted and provided to a 12 MHz digital filter 608d configured to pass the lowest 12 MHZ of the low LTE channel. The down-converted high LTE channel may be provided to an 8 MHz filter 608c configured to pass the highest 8 MHz of the high LTE channel. Cumulatively the lower 12 MHz lower channel and the higher 8 MHz higher channel comprise anon-contiguous secondary LTE communication channel that may be used to transmit data originally transmitted by the contiguous lower/higher LTE channel.

In frequency diagram 618 the low LTE channel may be down-converted and provided to an 18 MHz digital filter 608f configured to pass the lowest 18 MHZ of the low LTE channel. The down-converted high LTE channel may be provided to a 2 MHz filter 608a configured to pass the highest 2 MHz of the high LTE channel. Cumulatively the lower 18 MHz lower channel signal and the higher 2 MHz higher channel signal comprise a non-contiguous secondary LTE communication channel that may be used to transmit data originally transmitted by the contiguous lower/higher LTE channel.

Figure 7B:
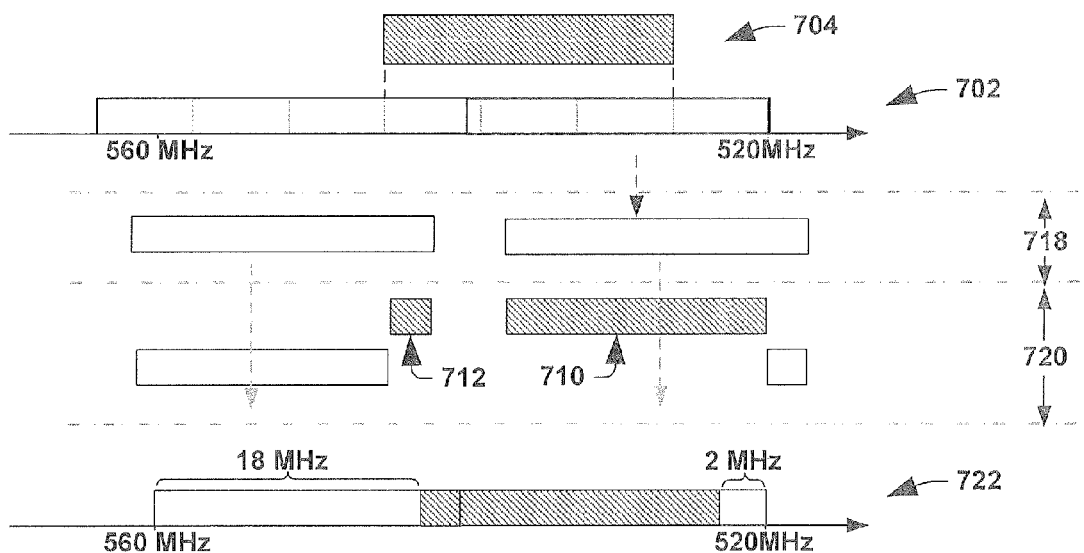

In one embodiment, wherein the filter array comprises filters having fixed frequency ranges (e.g., a 2 MHz bandpass filter configured to pass frequencies of 10-12 MHz) the same filter may be used to filter an upper section of a channel (e.g., the upper 2 MHz of a high LTE channel) and a lower section of a channel (e.g., the lower 2 MHz of a low LTE channel) by configuring the down-converter to generate a down-converted input signal having a frequency that is configured to properly fit with the filter's fixed frequency ranges. For example, as shown in FIG. 7a (related to frequency diagram 612), wherein a 2 MHz filter 710 passes a low part of the low LTE channel, mixer (e.g., 502a) may be configured to generate a down-converted signal having a frequency of 18-38 MHz that is provided to a bandpass filter configured to pass 18-20 MHz. In FIG. 7b (related to frequency diagram 618) the same 2 MHz filter 710 may be used to pass a 2 MHz frequency at a high part of the high LTE channel, by having mixer (e.g., 502b) generate a down-converted signal having a frequency of 0-20 MHz that is provided to the bandpass filter configured to pass 18-20 MHz.

The filtering configurations utilized in frequency diagrams 620, 622, 624, 626, and 628, are similar to those described supra in relation to frequency diagrams 614, 616, 618, and 620, respectively.

Figure 8:
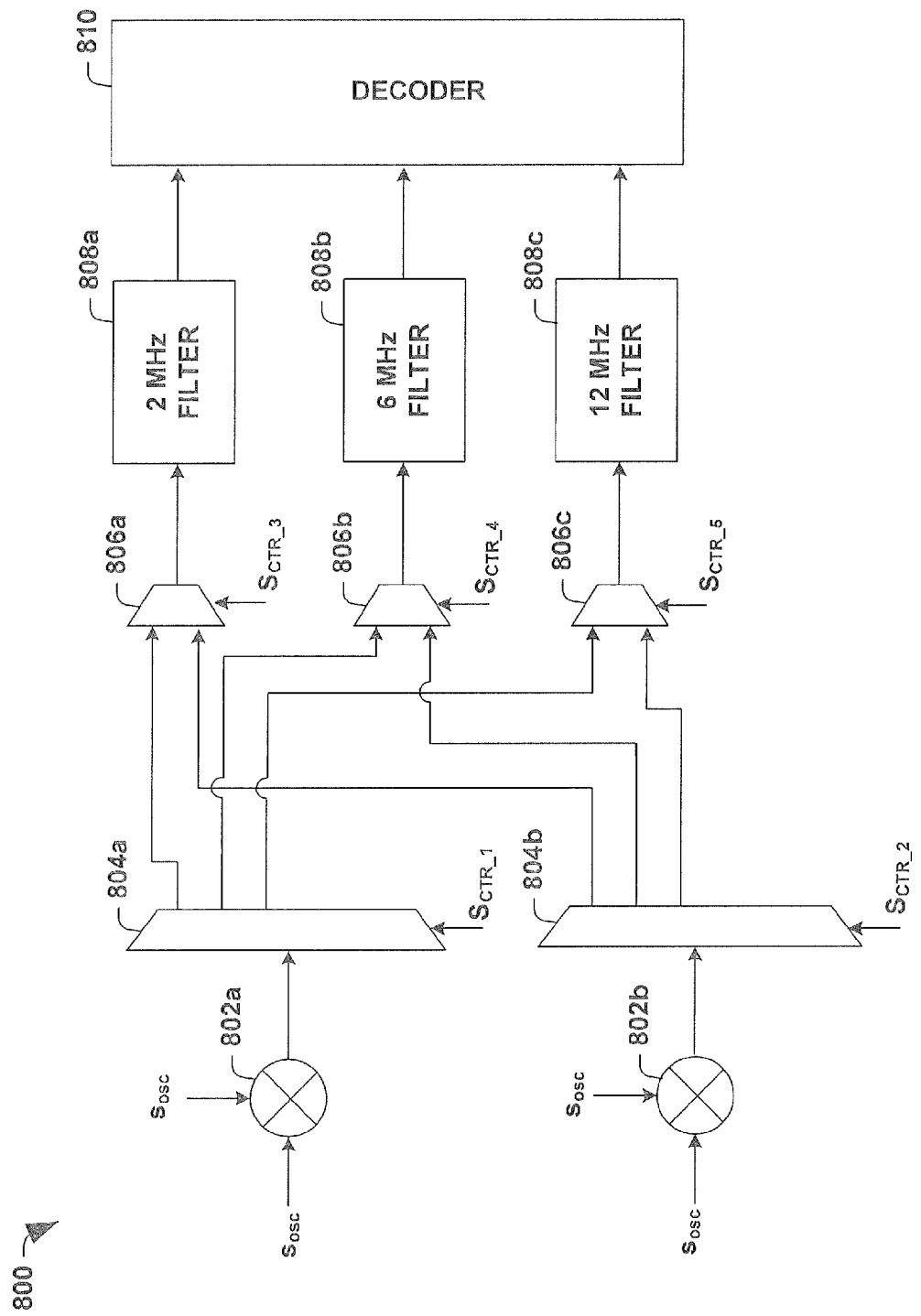
FIG. 8 illustrates an alternative embodiment of a reassignment circuit, wherein the reassignment circuit comprises a filter array configured to aggregate usage of the filters.

In one embodiment, a filtering array may comprise a plurality of filters that may be aggregately used, thereby reducing the number of filters present in a reassignment circuit (e.g., in reassignment circuit 600, the number of filters may be reduced from six filters to three filters). FIG. 8 illustrates one embodiment of a reassignment circuit 800, wherein the reassignment circuit 800 comprises a filter array configured to aggregate usage of the filters (e.g., a 2 MHz filter 808a and a 6 MHz filter 808b can be aggregated for perform the filtering function of an 8 MHz filter) to generate a 20 MHz non-contiguous channel. Therefore, reassignment circuit 800 provides the same functionality of reassignment circuit 600, but does so with a simplified circuit that combines filters to achieve the same results. Although, reassignment circuit 800 illustrates the aggregation of filters to form a 20 MHz non-contiguous channel, it will be appreciated that the same methodology may similarly be used to generate non-contiguous channels having other bandwidths.

Referring again to FIG. 8, reassignment circuit 800 comprises a 2 MHz filter 808a, a 6 MHz filter 808b, and a 12 MHz filter 808c that are actually implemented. However, based upon the actually implemented filters, an 8 MHz filter, a 15 MHz filter, and an 18 MHz filter may additionally be realized. For example, an 8 MHz filter may be realized based on the 2 MHz and the 6 MHz filters, a 14 MHz may be realized based on the 2 MHz filter and the 12 MHz filter, and an 18 MHz filter may be realized based on the 6 MHz filter and the 12 MHz filter.

Therefore, the reassignment circuit 800 may accomplish generation of the non-contiguous secondary communication channels shown in FIG. 6 as follows. The non-contiguous frequency spectrums of frequency diagrams 614 and 620 may be accomplished using a 2 MHz actually implemented filter (lower channel, usage of 2 MHz filter) and an 18 MHz realized filter (upper channel, usage of 6 MHz and 12 MHz filters). The non-contiguous frequency spectrum of frequency diagram 616 may be accomplished using a 12 MHz actually implemented filter (lower channel, usage of 12 MHz filter) and a realized 8 MHz filter (upper channel, usage of 6 MHz and 2 MHz filters). The non-contiguous frequency spectrum of frequency diagram 618 may be accomplished using an 18 MHz realized filter (lower channel, usage of 6 MHz and 12 MHz filters) and a 2 MHz actually implemented filter (upper channel, usage of 2 MHz filter). The non-contiguous frequency spectrum of frequency diagram 622 may be accomplished using a realized 8 MHz filter (lower channel, usage of 6 MHz and 2 MHz filters) and a 12 MHz actually implemented filter (upper channel, usage of 12 MHz filter). The non-contiguous frequency spectrum of frequency diagram 624 may be accomplished using a 14 MHz realized filter (lower channel, usage of 2 MHz and 12 MHz filters) and 6 MHz actually implemented filter (upper channel, usage of 6 MHz filter). The non-contiguous frequency spectrum of frequency diagram 628 may be accomplished using a 6 MHz actually implemented filter (lower channel, usage of 6 MHz filter) and a 14 MHz realized filter (upper channel, usage of 2 MHz & 12 MHz filters).

Figure 9:
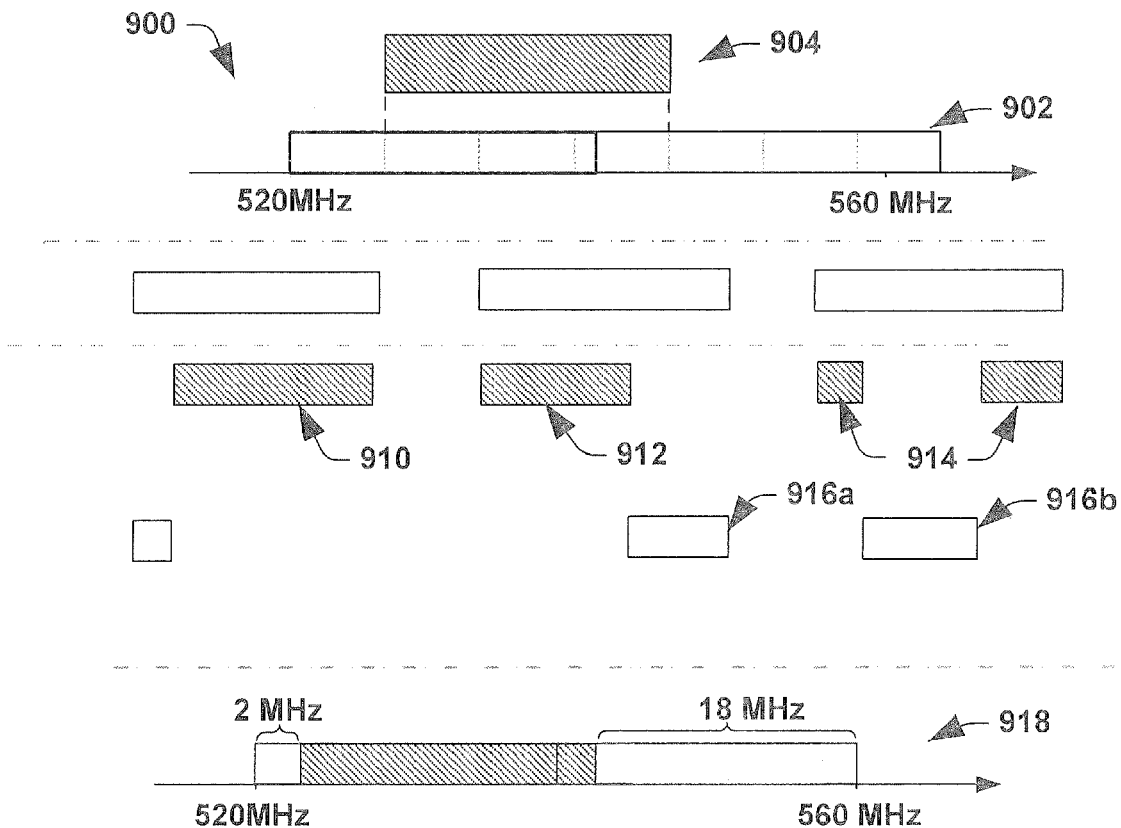
FIG. 9 illustrates frequency diagrams illustrating the aggregation of filters to achieve a larger filtering function.

FIG. 9 illustrates a particular example of the aggregation of filters to generate the non-contiguous frequency spectrum of frequency diagram 614 of FIG. 6. In particular, when a primary user signal 904 enters a white space 902, a non-contiguous frequency spectrum (e.g., corresponding to 612) may be accomplished using a 2 MHz actual filter 910 on the low LTE channel and a 6 MHz filter 912 and a 12 MHz filter 914 on the high LTE channel (cumulatively realizing an 18 MHz filter). In one embodiment, wherein the filters comprise bandpass filters the 6 MHz filter 912 and the 12 MHz filter 914 may be configured to filter the high LTE channel separately and then the results of the filtering 916a and 916b may be combined to achieve the final non-contiguous signal 918. For example, the 6 MHz bandpass filter 912 configured filter a high LTE channel may pass 2-8 MHz of a downconverted high LTE channel having a frequency of 0-20 MHz, while the 12 MHz bandpass filter 914 may pass 8-20 MHz of the downconverted high LTE channel, thereby cumulatively passing 18 MHz of the high LTE channel.

Figure 10:
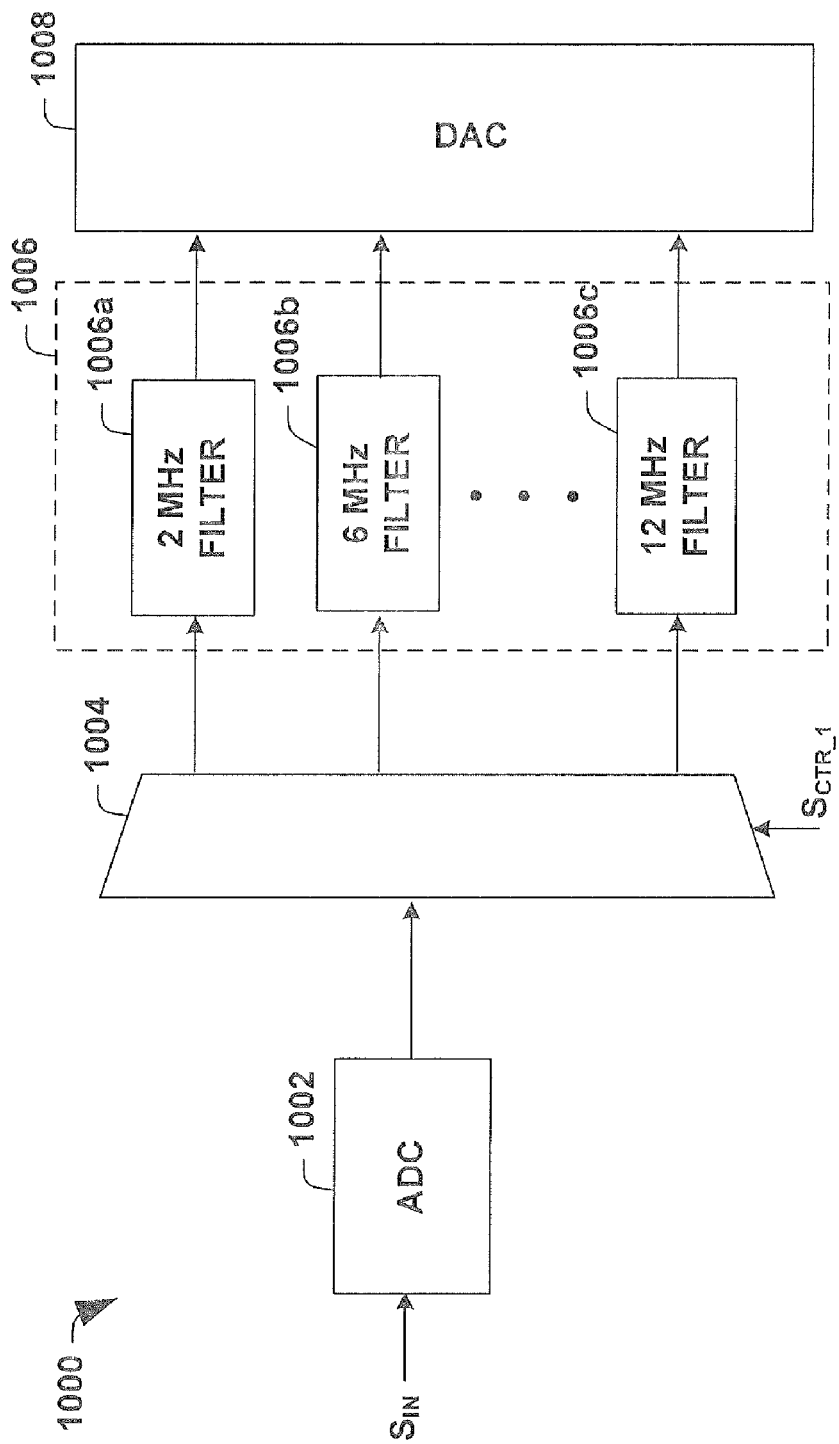
FIG. 10 illustrates an embodiment of a reassignment circuit wherein the filter array comprises a plurality of digital filters.

In one embodiment, the reassignment circuit may comprise a digital filter array configured to form a non-contiguous communication channel. FIG. 10 illustrates an embodiment of a reassignment circuit 1000 wherein the filter array 1006 comprises a plurality of digital filters 1006a-1006n. As shown in FIG. 10, the reassignment circuit comprises a signal input signal provided to an analog to digital converter 1002. The ADC provides an output to one or more digital multiplexors 1004 configured to provide the digital signal to a digital filter array 1006. The digital filters 1006a-1006n may use a digital processor to perform numerical calculations (e.g., multiplying the input values by constants and adding the products together) on sampled values of the input signal. The numerical calculations may result in a frequency translation of the input signal to produce translated signal having a frequency that is larger or smaller than the original signal. A DAC 1008 is provided downstream of the digital filter array to convert the output of the digital filters to an analog signal.

Each of the plurality of digital filters 1006a-1006n is configured to provide an output signal having a different translated bandwidth. For example, the 2 MHz digital filter 1006a is configured to receive a 20 MHz input signal (e.g., extending from 520-540 MHz), to digitally filter the input signal, and to output a translated signal corresponding to 2 MHz of the 20 MHz signal (e.g., extending from 512-514 MHz).

Figure 11:
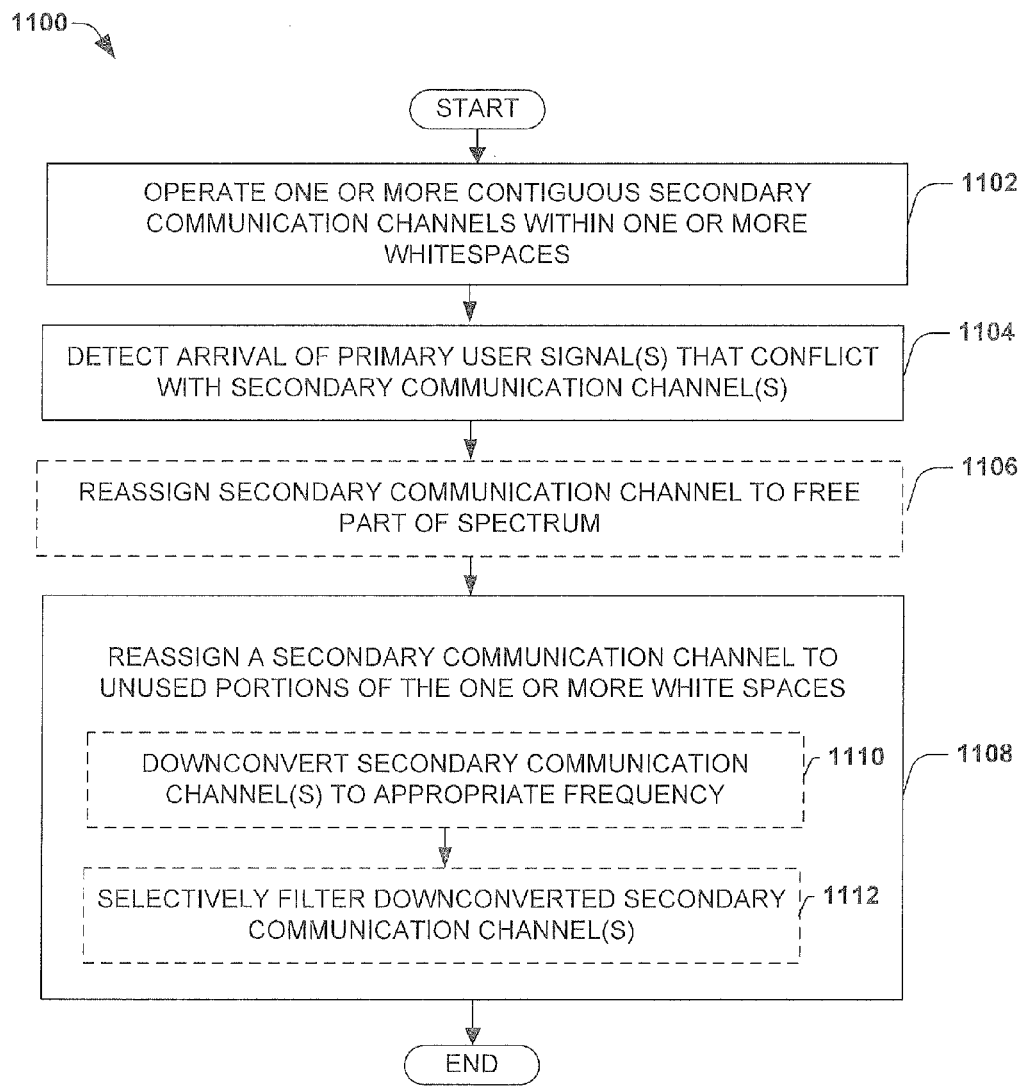
FIG. 11 is a flow diagram showing a method for reassigning a contiguous secondary communication channel to a non-contiguous secondary communication channel.

FIG. 11 illustrates an exemplary flow diagram showing an exemplary method for reassigning one or more contiguous secondary communication channels to a non-contiguous communication channel within a white space upon the arrival of a primary user signal within the white space.

While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIGS. 1, 2A, 2B, etc., are non-limiting examples of circuits that may be used to implement method 1100). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 1102 one or more contiguous secondary communication channels are operated at contiguous frequency ranges within one or more white spaces. The one or more secondary communication channels may comprise a frequency band extending contiguously between a first frequency and a second different frequency. For example, in one embodiment the secondary communication channel may comprise a frequency band extending from 520 MHz to 540 MHz. In an alternative embodiment, the two neighboring secondary communication channels may comprise LTE communication channels, individually having a 20 MHz bandwidth and cumulatively extending from 520 MHz to 560 MHz. In one embodiment, the secondary communication channel may comprise a communication channel used by a PSME application (e.g., wireless microphones).

At 1104 one or more primary user(s) arrive within the white space(s) at a frequency that conflicts with that of the one or more secondary communication channels. The primary user may comprise a user originally allocated to the frequency at which the white space occurs and having a priority that is greater than that of the secondary user. For example, in one embodiment the primary user may comprise a TV broadcaster within a TV channel frequency allocation. Alternatively, the primary user may comprise an incumbent user (e.g., a radio service/system) in a PSME system.

At 1106 one of the secondary communication channels may be reassigned to another part of the spectrum at 1208. For example, one of the secondary communication channels may be reassigned from a white space to a frequency outside of the white space (e.g., to a frequency spectrum originally allocated to the use of the secondary communication channel).

Another of the secondary communication channels is reassigned to unused portions of the white space remaining after the arrival of the primary user at 1108. In one embodiment the secondary communication channel may be reassigned to non-contiguous parts of the white space which remain free after the arrival of the primary user at 1108. For example, the contiguous frequency of the contiguous secondary communication channel data may be divided and assigned to non-contiguous sections of the white space comprising frequencies 520 MHz to 530 MHz and 550 MHz to 560 MHz, for example, which cumulatively comprise a bandwidth sufficient to comprise the secondary communication channel. In an alternative embodiment, the secondary communication channel may be reassigned to an unused portion of the white space having a reduced contiguous bandwidth (e.g., having a contiguous bandwidth smaller than the original secondary communication channel) remaining unused after the arrival of the primary user.

In one embodiment, reassignment of the secondary communication channel to non-contiguous parts of the white space remaining after arrival of a primary user may be accomplished by downconverting one or more secondary communication channels to an appropriate frequency to enable proper filtering (1110) and then selectively filtering the downconverted secondary communication channels (1112) to remove frequencies that conflict with the primary user signal frequency.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for reassigning a contiguous secondary communication channel, comprising:
    operating one or more secondary communication channels having a first priority at a contiguous secondary frequency range within a white space having a continuous frequency range;
    detecting an arrival of one or more primary user signals within the white space, wherein the primary user signals have a higher priority than the first priority and wherein the primary user signals have a primary frequency range that conflicts with the secondary frequency ranges and that provide for one or more unused sections of the white space; and
    reassigning the one or more contiguous secondary communication channels from the white space to at least one of the one or more unused sections of the white space.

2. The method of claim 1, wherein reassigning the one or more contiguous secondary communication channels, comprises:
    reassigning the one or more contiguous secondary communication channels to one or more non-contiguous secondary communication channels comprising non-contiguous frequency spectrums within the unused sections of the white space.

3. The method of claim 1, wherein reassigning the one or more contiguous secondary communication channels, comprises:
    reassigning the one or more contiguous secondary communication channels to unused sections of the white space having a contiguous bandwidth smaller than the one or more contiguous secondary communication channels.

4. The method of claim 1, wherein the one or more secondary communication channels comprise Long Term Evolution (LTE) communication channels, International Mobile Telecommunications (IMT)-Advanced bands, military bands, public safety bands, or wireless medical telemetry bands.

5. A method for constructing a non-contiguous secondary communication channel, comprising:
    operating one or more secondary communication channels having a first priority at a contiguous secondary frequency range within a white space;
    detecting an arrival of a primary user signal within the white space, wherein the primary user signal has a higher priority than the first priority and wherein the primary user signal has a primary frequency range that conflicts with the contiguous secondary frequency range and that provides for unused sections of the white space; and
    reassigning the one or more secondary communication channels to one or more non-contiguous secondary communication channels comprising non-contiguous frequency spectrums within the unused sections of the white space, which have a contiguous bandwidth smaller than the contiguous secondary frequency range.

6. The method of claim 5, wherein the one or more secondary communication channels comprise a low secondary communication channel located adjacent to a high secondary communication channel, wherein the low secondary communication channel has a lower frequency range than the high secondary communication channel.

7. The method of claim 6, wherein the low and high secondary communication channel comprises Long Term Evolution (LTE) communication channels, and wherein the white space comprises a TV white space.

8. The method of claim 7, further comprising filtering the low and high secondary communication channels to enable the formation of the non-contiguous secondary communication channel for any frequency range the primary user occupies within the TV white space.

9. The method of claim 8, further comprising:
    downconverting the low secondary communication channel to a frequency range that enables filtering to form the non-contiguous frequency spectrum; and
    downconverting the high secondary communication channel to a frequency range that enables filtering to form the non-contiguous frequency spectrum.

10. The method of claim 5, wherein upon arrival of the primary user signal within the white space one of the secondary communication channels is reassigned to a frequency range outside of the white space, while the remaining one of the secondary communication channels is provided to a plurality of filters configured to generate the non-contiguous secondary communication channel from the unused sections of the white space.

11. A communication circuit, comprising:
    a frequency reassignment circuit configured, upon arrival of a primary user signal within a white space having a continuous frequency range, to reassign a contiguous secondary communication channel, operating within the white space, to a non-contiguous secondary communication channel having a non-contiguous frequency spectrum within the white space;
    wherein the primary user signal has a first priority and the secondary communication channel has a second priority less than the first priority, and
    wherein the non-contiguous secondary communication channel is assigned to have frequencies that are different than a frequency range of the primary user signal.

12. The circuit of claim 11, wherein the frequency reassignment circuit comprises:
    a filter array comprising a plurality of filters configured to generate the non-contiguous secondary communication channel; and
    a routing logic circuit configured, upon arrival of the primary user signal within the white space, to selectively re-route a contiguous secondary communication channel to one or more of the plurality of filters within the filter array.

13. The circuit of claim 12, wherein the white space comprises a low secondary communication channel located adjacent to a high secondary communication channel, wherein the low secondary communication channel has a lower frequency range than the high secondary communication channel, and wherein the contiguous secondary communication channel comprises either the low or high secondary communication channel.

14. The circuit of claim 13, wherein upon arrival of the primary user signal within the white space one of the secondary communication channels is moved to a frequency range outside of the white space, while the remaining one of the secondary communication channels is provided to the plurality of filters configured to generate the non-contiguous secondary communication channel from unused sections of the white space.

15. The circuit of claim 13, wherein the low channel comprises a low LTE channel, wherein the high channel comprises a high LTE channel, and wherein the white space comprises a TV white space.

16. The circuit of claim 15, wherein the plurality of filters are configured to enable the formation of a non-contiguous secondary communication channel for any frequency range the primary user occupies within the TV white space.

17. The circuit of claim 13, wherein the routing logic comprises a plurality of multiplexors configured to provide the low communication channel to one or more selected filters in response to one or more control signals and further configured to provide the high communication channel to one or more selected filters in response to one or more control signals.

18. The circuit of claim 17, wherein the routing logic is configured to provide the input signal to a combination of the plurality of filters, thereby realizing an aggregate filtering function based upon the combination.

19. The circuit of claim 13, further comprising:
a first down converter configured to down convert the low channel to a frequency range that enables the plurality of filters to form a non-contiguous signal that avoids the primary user signal frequency; and
a second down converter configured to down convert the high channel to a frequency range that enables the plurality of filters to form a non-contiguous signal that avoids the primary user signal frequency.

20. The circuit of claim 12, wherein the plurality of filters comprise digital filters.

* * * * *